(12) United States Patent
Ku

(10) Patent No.: US 11,319,848 B2
(45) Date of Patent: May 3, 2022

(54) VARIABLE VALVE FOR MUFFLER AND DUAL MUFFLER HAVING THE SAME

(71) Applicants: Hyundai Motor Company, Seoul (KR); Kia Motors Corporation, Seoul (KR)

(72) Inventor: Ja Kyung Ku, Seongnam-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 672 days.

(21) Appl. No.: 16/288,335

(22) Filed: Feb. 28, 2019

(65) Prior Publication Data
US 2020/0123948 A1 Apr. 23, 2020

(30) Foreign Application Priority Data
Oct. 18, 2018 (KR) .................. 10-2018-0124165

(51) Int. Cl.
| *F01N 1/16* | (2006.01) |
| *F16K 5/06* | (2006.01) |
| *F01N 13/08* | (2010.01) |
| *G10K 11/162* | (2006.01) |

(52) U.S. Cl.
CPC ............ *F01N 1/163* (2013.01); *F01N 13/08* (2013.01); *F16K 5/0647* (2013.01); *G10K 11/162* (2013.01)

(58) Field of Classification Search
CPC . F01N 1/16; F01N 1/161; F01N 1/163; F01N 1/166; F01N 1/18; F01N 13/08; F01N 2470/14; F01N 2470/16; F01N 2470/18; G10K 11/162; F16K 5/0647
See application file for complete search history.

(56) References Cited

U.S. PATENT DOCUMENTS

| 2005/0220679 A1* | 10/2005 | Choi ..................... F01N 13/009 |
| | | 422/177 |
| 2016/0305347 A1* | 10/2016 | Penzkofer ............. F16K 5/0605 |
| 2018/0355778 A1* | 12/2018 | Callahan ................ F01N 3/043 |

FOREIGN PATENT DOCUMENTS

| JP | 60216016 A | * 10/1985 | ............ F01N 1/166 |
| JP | 11081977 A | * 3/1999 | ............ F01N 1/166 |
| KR | 10-1316520 B1 | 10/2013 | |
| KR | 10-2014-0080644 A | 7/2014 | |

* cited by examiner

*Primary Examiner* — Jeremy A Luks
(74) *Attorney, Agent, or Firm* — Morgan, Lewis & Bockius LLP

(57) ABSTRACT

A variable valve for a muffler may include an actuator; a valve tube having an inlet into which exhaust gas is flowed, and a first outlet and a second outlet into which the exhaust gas is discharged, and installed in a middle of a tail pipe into which the exhaust gas is discharged from a muffler; and a valve body in a ball shape rotatably installed in the valve tube, and rotatable by a rotational force delivered from the actuator to block the inlet, or to communicate the inlet with a selected one of the first outlet and the second outlet according to a rotated state of the valve body.

8 Claims, 6 Drawing Sheets

[FIG. 1]
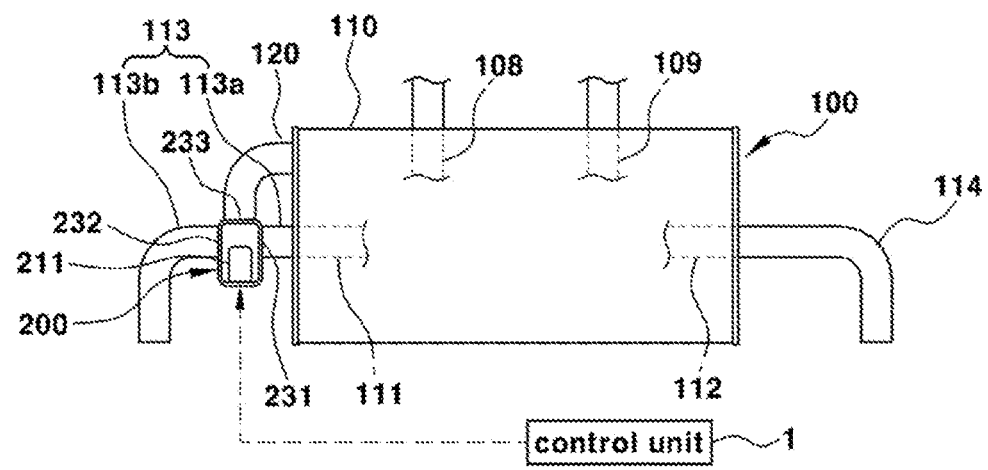
[FIG. 2]
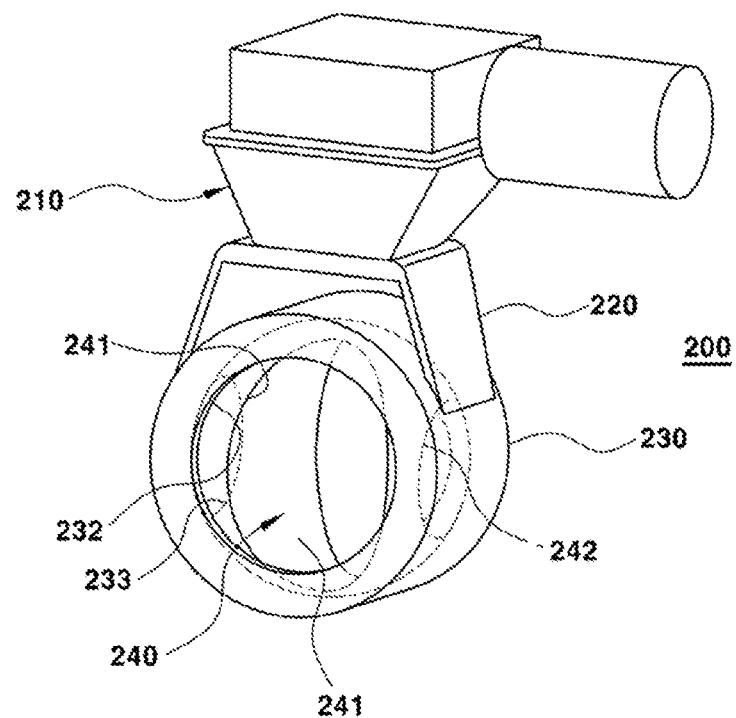

[FIG. 3]
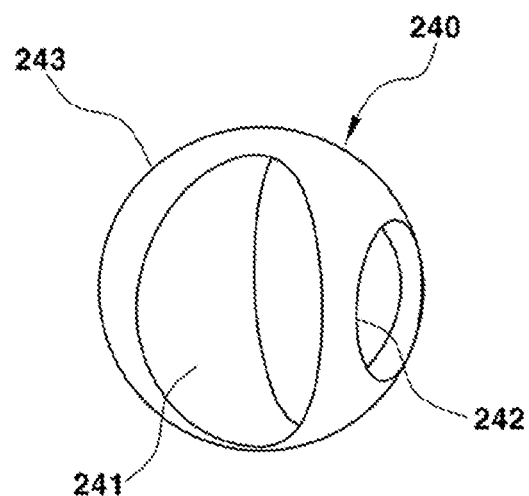
[FIG. 4]
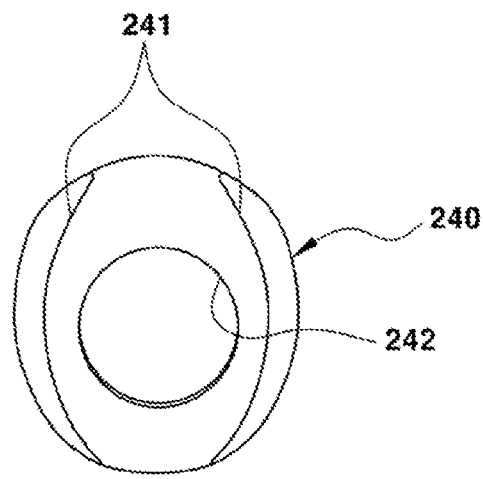

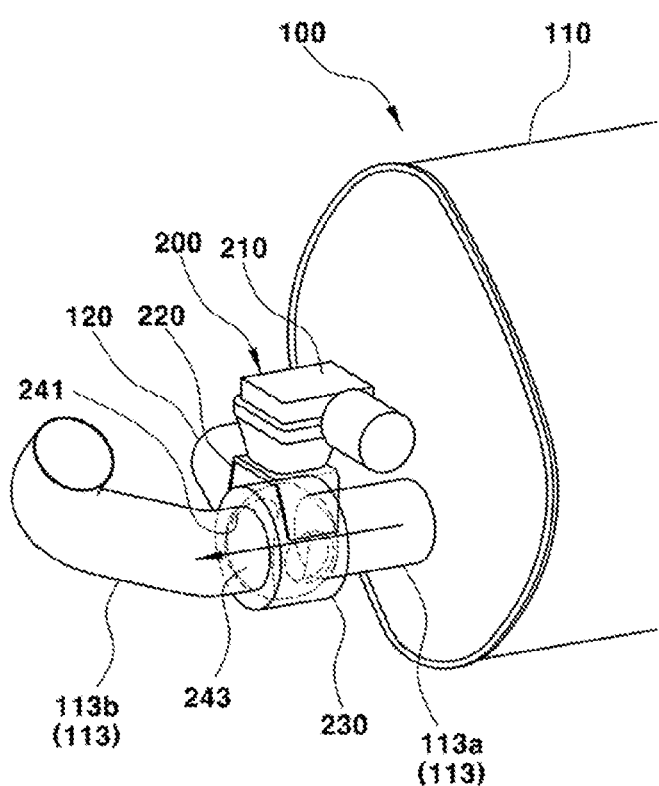
[FIG. 5]

[FIG. 6]
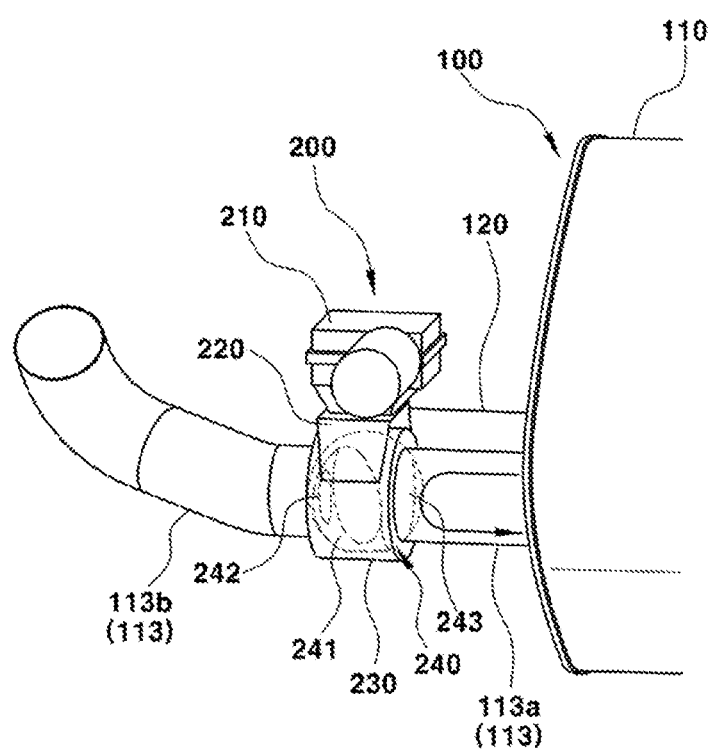

[FIG. 7]
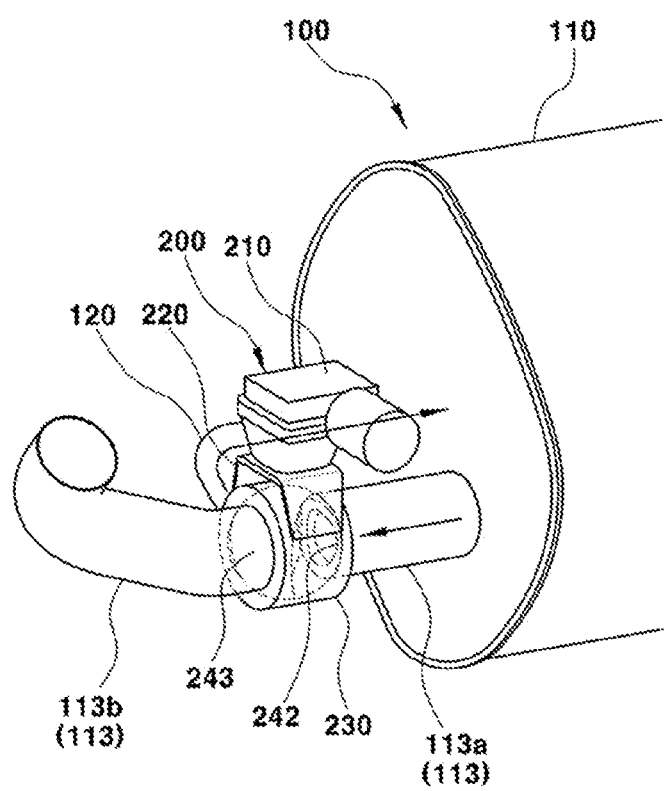

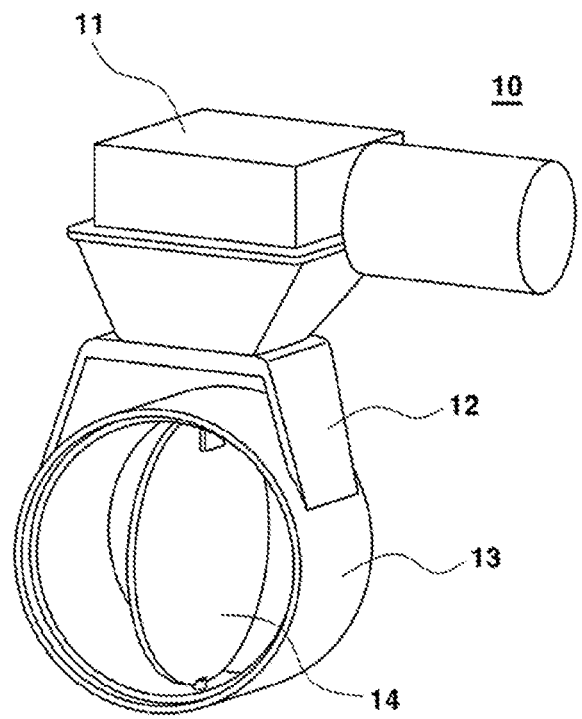
[FIG. 8]
--RELATED ART--

VARIABLE VALVE FOR MUFFLER AND DUAL MUFFLER HAVING THE SAME

CROSS-REFERENCE TO RELATED APPLICATION

This application claims the benefit of priority to Korean Patent Application No. 10-2018-0124165 filed on Oct. 18, 2018, the entire contents of which are incorporated herein by reference.

TECHNICAL FIELD

The present disclosure relates to a variable valve for a muffler and a dual muffler having the same, and more particularly, to a variable valve for a muffler and a dual muffler having the same, which can control exhaust gas flow and exhaust sound more variously.

BACKGROUND

An exhaust system for an automobile is for discharging high temperature and high pressure exhaust gas, which is generated after combustion in a combustion chamber of an engine, to the atmosphere, and includes an exhaust gas purifying device for removing harmful substances contained in the exhaust gas, and a muffler for reducing exhaust noise.

Among them, the muffler is installed at the rear end of an exhaust pipe in the engine, and is a device for reducing the exhaust noise by gradually lowering the pressure and temperature of the exhaust gas because a large exhaust noise can be generated due to a sudden pressure fluctuation when the high-temperature and high-pressure pulsating exhaust gas discharged from the engine is directly discharged to the atmosphere.

The muffler has a configuration in which a plurality of pipes and baffles are installed inside a closed tubular housing for reducing exhaust booming components through expansion, contraction, and interference effects of the exhaust gas.

The pipes installed inside the housing in the muffler include an inlet pipe that is connected to an exhaust pipe extended from the engine side and into which exhaust gas is flowed, and an outlet pipe that is connected to a tail pipe and discharges the exhaust gas to the tail pipe, and in addition, a single intermediate pipe or a plurality of intermediate pipes penetrating a baffle in the inner space of the housing can be installed therein.

In addition, the baffle installed inside the housing of the muffler serves as a partition wall for partitioning the inner space of the housing, and the housing has a plurality of chambers as the internal space is partitioned by the baffle.

Further, each of the pipes in the muffler can be formed with perforated holes for communicating the space in the pipe with the space in the chamber, and the baffle can be also formed with perforated holes for communicating between the spaces in the adjacent chambers.

The muffler having such a configuration lowers exhaust noise by inducing expansion, resonance, and sound absorption of the exhaust gas while the exhaust gas passes through the pipes, the perforated holes, and the chambers partitioned by the baffle.

Further, when the noise reduction effect is increased in the muffler, the resistance against the flow of the exhaust gas increases, and the engine output is lowered, such that a balanced design is required for satisfying both the noise reduction effect and the engine output.

Recently, there is increasingly a demand for Noise, Vibration, and Harshness (NVH) performance and back pressure performance of the muffler, but there are certain limitations in increasing the size of the muffler in order to meet such a requirement.

Accordingly, in order to overcome the difficulty in increasing the size of the muffler, it is known to install a variable valve for opening and closing a flow path in the pipe or the tail pipe, etc. in the muffler.

The variable valve is an electronic valve controlled by a control signal outputted from the control unit, and can be controlled by an opening/closing operation according to an engine speed (RPM), and as a result, the exhaust noise and the engine output can be controlled according to the engine speed.

For example, in an idle region or a low speed region of the engine, it is possible to increase back pressure by blocking the flow of the exhaust gas, thus reducing noise, and in middle and high speed regions of the engine, to reduce the back pressure and the noise of the exhaust gas while opening the flow of the exhaust gas, thus enhancing the engine output.

FIG. 8 is a perspective diagram illustrating a conventional electronic variable valve for a muffler, and as illustrated, a conventional variable valve 10 can be configured to include an actuator 11, a bracket 12, a valve tube 13, and a gate 14.

The valve tube 13 is installed in a tail pipe or a pipe in a muffler, and a space in the valve tube becomes a part of a flow path through which exhaust gas passes and flows.

In addition, the bracket 12 is installed at the upside of the valve tube 13, and the gate 14 that rotates to open and close the flow path in the valve tube is mounted inside the valve tube 13.

Further, a boss (or a shaft) (not illustrated) for coupling to penetrate the upper end portion of the valve tube 13 and the bracket 12 is integrally formed on the upper end of the gate 14 to be protruded upwards.

A motor (not illustrated) that is driven and controlled according to a control signal output from a control unit not illustrated is embedded in the actuator 11, and the rotation shaft of the motor and the gate 14 are connected to each other to deliver a rotational force.

Meanwhile, in the conventional electronic variable valve, the gate 14 in a plate shape rotates to open or close the flow path, thus connecting or disconnecting the flow of the exhaust gas and further controlling the exhaust sound.

That is, it is possible to open or close the flow path according to the engine speed (RPM) to make a desired sound, and to control the exhaust sound by opening the valve in a desired speed region and closing the valve in other speed regions, thus performing a control of the exhaust sound that makes the booming sound larger or smaller.

However, there is a limitation in the exhaust sound control performance only by opening and closing the flow path like the conventional electronic variable valve.

The above information disclosed in this Background section is only for enhancement of understanding of the background of the disclosure and accordingly it can contain information that does not form the prior art that is already known in this country to a person of ordinary skill in the art.

SUMMARY

Accordingly, the present disclosure is intended to solve the above problem, and an object of the present disclosure is to provide a variable valve for a muffler and a dual muffler having the same, which can control exhaust gas flow and exhaust sound more variously.

Particularly, an object of the present disclosure is to provide an electronic variable valve for a muffler, which can make exhaust sound more variously than the convention, enhance the noise reduction performance through the muffler, and reduce the capacity and size of the muffler through the enhancement of the noise reduction performance.

In order to achieve the object, according to one aspect of the present disclosure, a variable valve for a muffler may include an actuator; a valve tube having an inlet into which exhaust gas is flowed and a first outlet and a second outlet into which the exhaust gas is discharged, the valve tube being installed in a middle of a tail pipe into which the exhaust gas is discharged from a muffler; and a valve body in a ball shape rotatably installed in the valve tube, and rotatable by a rotational force delivered from the actuator to block the inlet or communicate the inlet with a selected one of the first outlet and the second outlet according to a rotated state of the valve body; and the inlet of the valve tube is connected to an upstream pipe of the tail pipe between the muffler therewith, the first outlet of the valve tube is connected to a downstream pipe of the tail pipe for discharging the exhaust gas to atmosphere, and the second outlet of the valve tube is connected to a branch pipe for recirculating the exhaust gas flowed into the valve tube through the inlet into the muffler.

Further, according to another aspect of the present disclosure, a dual muffler may include a housing; a first tail pipe for discharging exhaust gas having passed through an inside of the housing; a second tail pipe for discharging the exhaust gas having passed through the inside of the housing; a variable valve installed in a middle of the first tail pipe; and a branch pipe interposed between the variable valve and the inside of the housing; and the variable valve has an inlet into which the exhaust gas is flowed, and a first outlet and a second outlet into which the exhaust gas is discharged, the inlet of the variable valve is connected to an upstream pipe of the first tail pipe between the housing therewith, the first outlet of the variable valve is connected to a downstream pipe of the first tail pipe for discharging the exhaust gas to atmosphere, and the second outlet of the variable valve is connected to a branch pipe for recirculating the exhaust gas flowed into the valve tube through the inlet into the housing.

As a result, according to the variable valve for muffler and the dual muffler having the same of the present disclosure, it is possible to further implement a mode in which the exhaust gas discharged from the muffler to the tail pipe is recirculated back to the muffler, thus enhancing the noise reduction performance and controlling the exhaust gas flow and the exhaust sound more variously.

In addition, according to the variable valve and dual muffler of the present disclosure, it is possible to enhance the noise reduction performance, thus reducing the capacity and size of the muffler, and finally reducing the weight and the material cost.

Other aspects and preferred embodiments of the disclosure are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the disclosure are discussed infra.

BRIEF DESCRIPTION OF THE DRAWINGS

The above and other features of the present disclosure will now be described in detail with reference to certain exemplary embodiments thereof illustrated in the accompanying drawings which are given herein below by way of illustration only, and thus are not limitative of the present disclosure, and wherein:

FIG. 1 is a perspective diagram illustrating a dual muffler including a variable valve in accordance with an embodiment of the present disclosure.

FIG. 2 is a perspective diagram illustrating an electronic variable valve in accordance with an embodiment of the present disclosure.

FIG. 3 is a front diagram illustrating a valve body of the variable valve in accordance with an embodiment of the present disclosure.

FIG. 4 is a perspective diagram illustrating the valve body of the variable valve in accordance with an embodiment of the present disclosure.

FIGS. 5 to 7 are diagrams illustrating a flow state of exhaust gas according to an operation state of the variable valve in accordance with an embodiment of the present disclosure.

FIG. 8 is a perspective diagram illustrating a conventional electronic variable valve for a muffler.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in section by the particular intended application and use environment.

In the figures, reference numbers refer to the same or equivalent sections of the present disclosure throughout the several figures of the drawing.

DETAILED DESCRIPTION

Hereinafter, embodiments of the present disclosure will be described in detail with reference to the accompanying drawings so that those skilled in the art to which the present disclosure pertains can easily practice the present disclosure. However, the present disclosure is not limited to the embodiments described herein but can be also embodied in other forms.

Throughout the specification, when a certain portion "includes" a certain component, it means that the component can further include other components, not excluding the other components unless specifically stated otherwise.

The present disclosure is to improve a conventional electronic variable valve that can perform only the opening and closing of the flow path for the one-directional exhaust gas flow, and relates to a variable valve for a muffler and a dual muffler having the same, which can control the exhaust gas flow and the exhaust sound more variously.

According to the electronic variable valve of the present disclosure, it is possible to make the exhaust sound more variously, to enhance the noise reduction performance, and to reduce the weight and the material cost by reducing the capacity and size of the muffler.

Hereinafter, specifically explaining a configuration of an embodiment with reference to the drawings, FIG. 1 is a perspective diagram illustrating a dual muffler including an electronic variable valve in accordance with an embodiment of the present disclosure, and FIG. 2 is a perspective diagram illustrating an electronic variable valve for a muffler in accordance with an embodiment of the present disclosure.

As illustrated in FIG. 1, an electronic variable valve 200 in accordance with an embodiment of the present disclosure can be used in a muffler 100 in an exhaust system for a vehicle, and more specifically, can be installed in a tail pipe 113 connected to an outlet pipe 111 in the muffler 100 in the exhaust system for the vehicle.

Herein, the muffler 100 has a configuration in which a plurality of pipes and baffles are installed in a closed tubular housing 110.

As pipes installed inside the housing 110 in the muffler 100, there are inlet pipes 108, 109 that are connected to an exhaust pipe (not illustrated) extended from an engine side and into which exhaust gas is flowed, and outlet pipes 111, 112 that are connected to the tail pipes 113, 114 and discharge the exhaust gas to the tail pipe, and in addition, a single intermediate pipe or a plurality of intermediate pipes penetrating the baffle in the inner space of the housing can be installed.

In addition, the baffle installed inside the housing 110 of the muffler 100 serves as a partition wall for partitioning the inner space of the housing, and the housing has a plurality of chambers as the inner space thereof is partitioned by the baffle.

In addition, the pipe in the housing of the muffler 100 can be formed with perforated holes for communicating the space inside the pipe with the space inside the chamber, and the baffle can also be formed with perforated holes for communicating between the spaces in the adjacent chambers.

In the present specification, the inlet pipe, the baffle, the intermediate pipe, the chamber, etc. installed in the muffler 100 are well known, such that exemplary examples through the drawings have been omitted, and a further detailed description thereof will also be omitted.

However, referring to FIG. 1, a part of the outlet pipes 111, 112 in the housing 110 of the muffler 100 is illustrated in a dotted line.

Further, the variable valve 200 in accordance with an embodiment of the present disclosure can be used in the dual muffler 100.

A dual muffler applicable to an exhaust system for a vehicle is disclosed in Korean Patent No. 10-1316520 (Oct. 1, 2013) filed and registered by the present applicant (Patent Document 1).

In an exhaust system adapting a dual muffler, when an exhaust pipe connected to the engine side of the vehicle has been installed to be lengthily extended to the rear of the vehicle, the dual muffler is generally located lengthily in the lateral direction in the vehicle as disclosed in the Patent Document 1.

In addition, in the dual muffler disclosed in the Patent Document 1, two inlet pipes are installed inside the housing of the muffler, and at this time, two exhaust pipes branched at the upstream side of the exhaust gas flow are connected to the respective inlet pipes.

In addition, two outlet pipes for discharging the exhaust gas having passed through the muffler are installed in the housing, and the respective outlet pipes are installed with a tail pipe connected thereto.

The tail pipes are each connected to both left and right end portions of the conventional dual muffler, and each tail pipe is connected to a corresponding outlet pipe installed in the housing at both left and right end portions of the muffler.

In addition, a dual muffler having one inlet pipe connected to the exhaust pipe and two outlet pipes is disclosed in Korean Patent Publication No. 10-2014-0080644 (Jul. 1, 2014) (Patent Document 2).

Even for the dual muffler disclosed in the Patent Document 2, the outlet pipes are each located at the right and left sides in the housing of the dual muffler, and each tail pipe connected at the left and right end portions in the housing of the muffler is connected to each outlet pipe in the housing.

Further, even in the dual mufflers disclosed in the Patent Documents 1 and 2, etc., perforated holes are formed in the pipes inside the housing, that is, the inlet pipe, the outlet pipe, etc., and the perforated holes are also formed in the baffles for partitioning the inner space of the housing into a plurality of chambers.

In addition, the pipes in the muffler can be installed in order to penetrate the baffle to extend over the plurality of chambers, and in addition to the inlet pipe and the outlet pipe, when intermediate pipes are further installed in order to penetrate the baffle in the housing of the muffler, the intermediate pipes can be also formed with perforated holes.

In such a muffler, the exhaust gas is moved in a manner to pass through the perforated holes of the pipe and the perforated holes of the baffle, and is moved from the inlet pipe to the chamber, from one side chamber to another chamber, and from the chamber into the outlet pipes of both left and right sides thereof.

In addition, thereafter, the exhaust gas, which has moved from the outlet pipes at both left and right sides thereof to the respective tail pipes, is discharged to the atmosphere through the tail pipe at the rear of the vehicle.

As described above, the two outlet pipes at both left and right sides thereof are communicated with the inner space of the housing, that is, the space in the chamber partitioned by the baffle, and as in the Patent Document 2, when the two outlet pipes at both left and right sides thereof have a structure that has been branched from one inlet pipe, the two outlet pipes can be directly connected to each other as well.

FIG. 1 illustrates the dual muffler 100, and as illustrated, the tail pipes 113, 114 are connected to both end portions of the housing 110 of the dual muffler 100, and the respective tail pipes 113, 114 are connected to the outlet pipes 111, 112 installed in the housing 110.

Accordingly, the exhaust gas is discharged from the muffler 100 to the tail pipes 113, 114 through the outlet pipes 111, 112.

Further, the electronic variable valve 200 in the form of a three-way valve for controlling exhaust gas flow is installed at one side of the tail pipe 113 installed in the dual muffler 100 in accordance with an embodiment of the present disclosure.

A branch pipe 120 is connected to the electronic variable valve 200, and the branch pipe 120 is installed to be inserted into the housing 110 of the muffler 100.

The branch pipe 120 is a pipe for connecting between the electronic variable valve 200 and the inner space (i.e., a chamber at one side) of the housing 110 of the muffler 100, and becomes a pipe for moving and circulating the exhaust gas, which is discharged from the outlet pipe 111 at one side thereof to the tail pipe 113, from the electronic variable valve 200 back to the inner space of the housing 110.

In the following description, the tail pipe 113 provided with the electronic variable valve 200 in accordance with an embodiment of the present disclosure of the two tail pipes 113, 114 connected to both left and right sides of the dual muffler 100 is referred to as a first tail pipe, and the tail pipe 114 provided at the opposite side thereof is referred to as a second tail pipe.

In addition, the outlet pipe 111 to which the first tail pipe 113 is connected is referred to as a first outlet pipe, and the outlet pipe 112 to which the second tail pipe 114 is connected is referred to as a second outlet pipe.

Further, the electronic variable valve 200 is installed in the middle of the first tail pipe 113, and even in the first tail pipe 113, a portion 113a that becomes the upstream of the electronic variable valve 200 is referred to as an upstream pipe, and a portion 113b that becomes the downstream of the electronic variable valve 200 is referred to as a downstream pipe, with respect to the direction of the exhaust gas flow.

The upstream pipe 113a in the first tail pipe 113 is a pipe portion connected from the muffler 100, and the downstream pipe 113b therein is a pipe portion for discharging the exhaust gas having passed through the variable valve 200 to the atmosphere.

In the dual muffler 100 in accordance with the present disclosure, it is a known configuration that the two outlet pipes 111, 112, that is, the first outlet pipe 111 and the second outlet pipe 112 are installed in the housing 110, and it is also a known configuration that separate tail pipes, that is, the first tail pipe 113 and the second tail pipe 114 are installed in the respective outlet pipes 111, 112.

However, the variable valve 200 is installed in the first tail pipe 113, the branch pipe 120, which is connected from the variable valve 200 to the inner space of the housing 110, is installed, and at this time, the branch pipe 120 re-circulates the exhaust gas discharged from the first outlet pipe 111 to the upstream pipe 113a of the first tail pipe 113 back to the inner space (that can become a chamber) of the housing 110.

At this time, the variable valve 200 is installed in the middle of the first tail pipe 113, is installed at a portion where the branch pipe 120 branches even in the first tail pipe 113, and has one inlet 231 and two outlets 232, 233.

The inlet 231 of the variable valve 200 is connected to the upstream pipe 113a of the first tail pipe 113, the first outlet 232 that is one of the two outlets 232, 233 of the variable valve 200 is connected to the downstream pipe 113b of the first tail pipe 113, and the second outlet 233 that is the other one of the two outlets of the variable valve 200 is connected to the branch pipe 120.

In addition, the variable valve 200 is controlled so that only one of the first outlet 232 and the second outlet 233 is opened in a state where the inlet 231 is closed or the inlet 231 is opened, and when the inlet 231 is closed, the exhaust gas flowing from the first outlet pipe 111 to the upstream pipe 113a of the first tail pipe 113 is prevented from flowing into the variable valve 200, and thereby the exhaust gas does not pass through the variable valve, such that the first tail pipe 113 is closed.

Accordingly, the exhaust gas is discharged to the atmosphere only through the second outlet pipe 112 and the second tail pipe 114.

On the other hand, when the first outlet 232 is opened and the second outlet 233 is closed in a state where the inlet 231 is opened, the exhaust gas flows the paths of the first outlet pipe 111, the upstream pipe 113a of the first tail pipe 113, the variable valve 200, and the downstream pipe 113b of the first tail pipe 113, and then is discharged to the atmosphere.

On the other hand, when the inlet 231 is opened but the first outlet 232 is closed and the second outlet 233 is opened, the exhaust gas flows the paths of the first outlet pipe 111, the upstream pipe 113a of the first tail pipe 113, the variable valve 200, the branch pipe 120, the housing 110, the second outlet pipe 112, and the second tail pipe 114, and then is discharged to the atmosphere.

That is, both when the inlet 231 has been closed, and when the inlet 231 has been opened but the first outlet 232 has been closed, the exhaust gas is not discharged to the first tail pipe 113, and the exhaust gas can be discharged only to the second tail pipe 114 at the opposite side thereof. In this case, the first tail pipe 113 is closed to prevent the exhaust gas from being discharged.

On the other hand, when the inlet 231 and the first outlet 232 have been opened, the exhaust gas can be discharged from the muffler 100 to both the first tail pipe 113 and the second tail pipe 114.

In the present disclosure, a state where the flow path of the first tail pipe is blocked so that the exhaust gas is not discharged to the first tail pipe based on the first tail pipe 113 is referred to as an all closed state.

On the other hand, a state where the flow path of the first tail pipe is opened so that the exhaust gas can be discharged through the first tail pipe 113 is referred to as an opened state. In the opened state, the exhaust gas can be simultaneously discharged through the first tail pipe 113 and the second tail pipe 114 in both directions.

Of course, the flow direction of the exhaust gas as described above is controlled by the variable valve 200, and the operation of the variable valve is controlled according to a control signal output from the control unit 1 so that the exhaust sound of the exhaust system can be controlled through a control of the exhaust gas flow.

Hereinafter, a configuration of the electronic variable valve for the muffler in accordance with an embodiment of the present disclosure will be described in detail with reference to FIGS. 2 to 4.

FIG. 3 is a front diagram illustrating a valve body of the variable valve in accordance with an embodiment of the present disclosure, and FIG. 4 is a perspective diagram illustrating the valve body of the variable valve in accordance with an embodiment of the present disclosure.

As illustrated in FIG. 2, the electronic variable valve 200 for the muffler in accordance with an embodiment of the present disclosure includes an actuator 210, a bracket 220, a valve tube 230, and a valve body 240.

In the configuration, the actuator 210 includes a motor (211 in FIG. 1) for generating and providing a rotational force, the motor 211 is embedded in the actuator 210, and the operation of the motor 211 is controlled according to a control signal output from the control unit 1.

The valve tube 230 is installed in the first tail pipe 113, the upstream pipe 113a of the first tail pipe 113 is connected to the inlet 231 of the front side of the valve tube 230 (an upstream side based on the direction of the exhaust gas flow), and the downstream pipe 113b of the first tail pipe 113 is connected to the first outlet 232 of the rear side of the valve tube 230 (a downstream side based on the direction of the exhaust gas flow).

That is, the valve tube 230 is installed in the middle of the first tail pipe 113, the upstream pipe 113a of the first tail pipe 113, the valve tube 230, and the downstream pipe 113b of the first tail pipe 113 constitute one pipe based on the direction of the exhaust gas flow, and at this time, the space in the valve tube 230 becomes a part of the flow path through which the exhaust gas passes in a state located in the middle of the first tail pipe 113.

In addition, as can be seen in FIG. 2, the valve tube 230 is provided in a short-length cylindrical tube shape, a portion to which the upstream pipe 113a of the first tail pipe 113 is connected becomes the inlet 231 of the variable valve 200, and an opposite portion to which the downstream pipe 113b of the first tail pipe 113 is connected becomes the first outlet 232 of the variable valve 200.

A hole is formed in the circumferential surface of the valve tube 230 to constitute the second outlet 233, and the branch pipe 120 is connected to the second outlet 233.

The bracket 220 is installed at the upside of the valve tube 230, and the actuator 210 is installed to be supported by the bracket 220.

The bracket 220 is a member that integrates by connecting the valve tube 230 in which the flow path becomes with the actuator 210 in which the motor 211 is embedded, and the actuator 210 is fixed to and mounted on the valve tube 230 through the bracket 220.

Meanwhile, the valve body 240 in a ball shape is rotatably installed inside the valve tube 230, and the valve body 240 is connected to be power-transferrable with the rotation shaft (not illustrated) of the motor 211 embedded in the actuator 210.

At this time, the shaft connected to the upper end portion of the valve body 240 and the rotation shaft of the motor 211 can be connected so that the rotational force can be transferred therebetween.

Accordingly, when the motor 211 is driven and the rotation shaft of the motor is rotated, the valve body 240 can receive the rotational force thereof, and as a result, as the operation of the motor 211 is controlled by the control unit 1, the rotational amount and rotational angle of the valve body 240 can be controlled.

In addition, the operation of the motor 211 is controlled so that the valve body 240 can be rotated by predetermined rotational amount and rotational angle inside the valve tube 230, such that the opening and closing of the inlet and outlet of the variable valve 200 is controlled, and as the opening and closing operation of the variable valve 200 is controlled, the exhaust gas flow and the exhaust sound are controlled.

Particularly, the valve body 240 blocks the inlet 231 of the valve tube 230 in order to prevent the exhaust gas from flowing into the valve tube 230 according to the rotation state thereof, or communicates the inlet 231 of the valve tube 230 with a selected one of the first outlet 232 and the second outlet 233.

For this purpose, as can be seen in FIGS. 3 and 4, a flow path hole 241, which can selectively communicate between the inlet 231 and the first outlet 232 of the valve tube 230 according to the rotation state of the valve body, is penetrated into and formed on the valve body 240, and in addition, a closing part 243, which can selectively block the inlet 231 and the first outlet 232 of the valve tube 230 according to the rotation state of the valve body, is formed at one side of the valve body 240.

In addition, an opening hole 242 of a structure connected to the flow path hole 241 is formed at the opposite side of the closing part 243 with the flow path hole 241 therebetween.

Further, the variable valve 200 is a ball-shaped valve for opening and closing the inlet 231 and the outlets 232, 233 of the valve tube 230 while the valve body 240 in a ball shape rotates inside the valve tube 230, such that when the valve body 240 is rotated inside the valve tube 230, the remaining surface of the valve body 240 on which the holes 241, 242 are not formed and the surface of the closing part 243 can be slid in a state closely contacted with the inside surface of the valve tube 230 and in a state of keeping the airtightness therebetween.

Meanwhile, the dual muffler 100 of the present disclosure includes the electronic variable valve 200 installed in the first tail pipe 113, and the branch pipe 120 installed to connect between the electronic variable valve 200 and the muffler 100.

In the dual muffler 100 of the present disclosure, the exhaust gas flow and the exhaust sound are controlled according to an operation state of the variable valve 200 to be controlled.

Hereinafter, operation states of the variable valve and the muffler in accordance with an embodiment of the present disclosure will be described.

The variable valve 200 in accordance with an embodiment of the present disclosure is controlled in an opened state where the first tail pipe 113 is opened so that the exhaust gas passes through and is discharged to the atmosphere, a first closed state where the inlet 231 of the variable valve 200 is completely closed in order to prevent the exhaust gas from being flowed into the variable valve 200, and a second closed state where the inlet 231 and the second outlet 233 of the variable valve 200 are opened and the first outlet 232 is closed so that the exhaust gas passes through the variable valve 200 and the branch pipe 120 to recirculate into the housing 110 of the muffler 100.

FIGS. 5 to 7 are diagrams illustrating a flow state of the exhaust gas according to an operation state of the variable valve in accordance with an embodiment of the present disclosure, and FIG. 5 illustrates the opened state, FIG. 6 illustrates the first closed state, and FIG. 7 illustrates the second closed state.

First, as illustrated in FIG. 5, when the motor 211 is operated and the valve body 240 is rotated so that the flow path hole 241 simultaneously opens the inlet 231 of the valve tube 230 and the first outlet 232 of the valve tube 230, that is, when the valve body 240 is rotated so that the flow path hole 241 connects between the inlet 231 and the first outlet 232 of the valve tube 230, the variable valve 200 becomes an opened state opening the first tail pipe 113.

At this time, the second outlet 233 is closed by the closing part 243 of the valve body 240.

In addition, the flow path hole 241 of the valve body 240 connects between the inlet 231 and the first outlet 232 of the valve tube 230, such that the path of the first tail pipe 113 is opened so that the exhaust gas passes through the upstream pipe 113a, the variable valve 200, and the downstream pipe 113b in turn and is discharged to the atmosphere.

Accordingly, the exhaust gas flowed from the first outlet pipe 111 in the muffler 100 into the inlet 231 of the valve tube 230 through the upstream pipe 113a of the first tail pipe 113 passes through the flow path hole 241 of the valve body 240 and then is discharged to the downstream pipe 113b of the first tail pipe 113 through the first outlet 232.

As described above, the exhaust gas flows roughly in a straight line while passing through the flow path hole 241 from the inlet 231 of the valve tube 230 toward the first outlet 232, and the opening hole 242 of the valve body 240 can be formed on the valve body 240 to be located in a direction roughly perpendicular to the straight flow direction of the exhaust gas going straight from the inlet 231 of the valve tube 230 to the first outlet 232 thereof.

The variable valve 200 opens the path that passes through the first tail pipe 113 in the opened state, such that the exhaust gas flowed into the muffler 100 can be discharged in both directions through the first outlet pipe 111 and the second outlet pipe 112, and the first tail pipe 113 and the second tail pipe 114.

Further, as illustrated in FIG. 6, when the motor 211 is operated in the opened state and the valve body 240 is rotated to become a state where the closing part 243 completely blocks the inlet 231 of the valve tube 230 (the inlet of the variable valve), the exhaust gas is prevented from being flowed into the variable valve 200 in a state where the inlet 231 of the valve tube 230 is blocked.

At this time, the first closed state is carried out where the exhaust gas is not flowed into the variable valve 200 and is blocked, and the first closed state is a state where the valve body 240 has been rotated by about 90 degrees in the opened state. In addition, the first closed state is a state where the closing part 242 blocks the inlet 231 of the valve tube 230, such that the opening hole 242 formed at the opposite side of the closing part 243 is in a location matched to the outlet 232 of the valve tube 230.

In the first closed state, the path of the exhaust gas flowing through the first tail pipe 113 is completely closed by the variable valve 200, such that the exhaust gas is prevented from being discharged to the outside through the first outlet pipe 111 and the first tail pipe 113, and accordingly, the entire exhaust gas in the muffler 100 is discharged to the atmosphere only through the second outlet pipe 112 and the second tail pipe.

Further, as illustrated in FIG. 7, when the motor 211 is operated and the valve body 240 has been rotated by about 90 degrees in an opposite direction from the opened state to the first closed state, that is, when the valve body 240 is rotated by 180 degrees from the first closed state, the opening hole 242 of the valve body 240 is matched and connected to the inlet 231 of the valve tube 230, and the closing part 243 of the valve body 240 becomes the second closed state where the valve tube 230 blocks the first outlet 232.

In the second closed state, the flow path hole 241 of the valve body 240 is matched and connected to the second outlet 233 of the valve tube 230, and accordingly, the inlet 231 of the valve tube 230 is communicated with the second outlet 233 of the valve tube 230 through the opening hole 242 and the flow path hole 241.

That is, the inlet 231 and the second outlet 233 of the valve tube 230 are opened by the opening hole 242 and the flow path hole 241 of the valve body 240, while the first outlet 232 is closed by the closing part 243, and accordingly, the passage of the upstream pipe 113a of the first tail pipe 113 and the branch pipe 120 is opened but the passage of the downstream pipe 113b of the first tail pipe 113 is closed.

As a result, the exhaust gas having passed through the first outlet pipe 111 and the upstream pipe 113a of the first tail pipe 113 from the muffler 100 is flowed into the variable valve 200 through the inlet 231 of the valve tube 230, then passes through the opening hole 242 and the flow path hole 241, then flows into the branch pipe 120 through the second outlet 233, and then is recirculated into the housing 110 of the muffler 100 through the branch pipe 120.

The exhaust gas thus recirculated into the housing 110 of the muffler 100 is discharged to the atmosphere through the second outlet pipe 112 and the second tail pipe 114, and even in the second closed state, the exhaust gas cannot be discharged to the atmosphere through the first tail pipe 113.

As describe above, in the electronic variable valve 200 and the dual muffler 100 having the same in accordance with the present disclosure, a control unit 1 can control an operation of the variable valve 200 in any one mode of a mode in the opened state, a mode in the first closed state, and a mode in the second closed state according to the driving conditions of the engine.

As describe above, in the mode in the opened state, the exhaust gas can be discharged in both directions through the first tail pipe 113 and the second tail pipe 114, but in the modes in the first closed state and the second closed state, the exhaust gas can be discharged to the atmosphere only through the second tail pipe 114.

Particularly, in the mode in the second closed state, the exhaust gas passes through the variable valve 200 and then is recirculated into the housing 110 of the muffler 100 through the branch pipe 120, and the exhaust gas thus recirculated and flowed back into the muffler 100 is discharged through a resonance chamber and a sound absorption chamber in the muffler, such that it is possible to greatly enhance the noise reduction performance by the muffler, and to reduce the capacity and size of the muffler according to the enhancement of the noise reduction performance.

In addition, only two modes in which the variable valve 200 opens and closes the flow path with respect to the flow of the exhaust gas flowing only in one direction could be conventionally implemented, but according to the electronic variable valve 200 of the present disclosure, in addition to the opened state and the first closed state as described above, the second closed state that recirculates the exhaust gas into the muffler can be further implemented.

Accordingly, various exhaust sounds can be generated according to the driving conditions of the engine, and for example, in a normal traveling, a middle or low speed traveling, or a mode for booming reduction, the control unit 1 can be set to control the variable valve 200 in the first closed state, such that the exhaust gas can be discharged only through the second tail pipe 114.

In addition, in a high speed traveling or a sport mode traveling, the control unit 1 can be set to control the variable valve 200 in the opened state, such that the exhaust gas can be simultaneously discharged through both tail pipes 113, 114.

In addition, the control unit 1 can be also set to control the variable valve 200 in the second closed state, such that the exhaust gas can be discharged through the second tail pipe 114 in a state where it is recirculated from the variable valve 200 into the muffler 100 through the branch pipe 120 to greatly reduce the noise.

In addition, the control unit 1 can be also set to control the variable valve 200 in the opened state upon takeoff of the vehicle (e.g., an engine RPM of 2500 rpm or less), thus increasing noise and improving a takeoff torque.

In addition, the control unit 1 can be set to open the variable valve 200 in order to increase the output regardless of the driver condition (sport/limousine/optimum) under a high speed operation condition that the engine RPM is a predetermined 4000 rpm or more.

Alternatively, the control unit 1 can be set to control the variable valve 200 in the first closed state so that the noise can be reduced by an increase in back pressure upon a creep traveling (an engine RPM of 600 to 1000 rpm) or upon takeoff (an engine RPM of 2500 rpm or less), or in an idle of the vehicle.

Alternatively, the control unit 1 can be set to control the variable valve 200 in the second closed state upon takeoff, such that it is possible to minimize an increase in the back pressure to supplement a takeoff torque, and simultaneously to reduce the noise by allowing the exhaust gas to pass through the inside of the muffler 100 once more.

As described above, the variable valve 200 has conventionally operated only in two modes of opening and closing the flow path with respect to the exhaust gas flow in one direction, but in the present disclosure, it is possible to more variously control the exhaust gas flow by blocking, discharging, and recirculating it, and as the exhaust gas flow can be thus controlled variously, it is also possible to control the exhaust sound more variously from the conventional two kinds to three kinds.

As described above, while the embodiments of the present disclosure have been described in detail, the scope of the present disclosure is not limited thereto, and various modifications and improvements by those skilled in the art using the basic concept of the present disclosure defined in the following claims is also included in the scope of the present disclosure.

What is claimed is:

1. A variable valve for a muffler, comprising:
an actuator;
a valve tube having an inlet into which exhaust gas is flowed, and a first outlet and a second outlet into which the exhaust gas is discharged, the valve tube being installed in a middle of a tail pipe into which the exhaust gas is discharged from a muffler; and
a valve body in a ball shape rotatably installed in the valve tube, and rotatable by a rotational force delivered from the actuator to block the inlet or to communicate the inlet with a selected one of the first outlet and the second outlet according to a rotated state of the valve body,
wherein the inlet of the valve tube is connected to an upstream pipe of the tail pipe between the muffler therewith,
wherein the first outlet of the valve tube is connected to a downstream pipe of the tail pipe for discharging the exhaust gas to atmosphere, and
wherein the second outlet of the valve tube is connected to a branch pipe for recirculating the exhaust gas flowed into the valve tube through the inlet into the muffler.

2. The variable valve for the muffler of claim 1,
wherein the valve body in the ball shape comprises
a closing part for blocking a selected one of the inlet, the first outlet, and the second outlet of the valve tube according to the rotated state of the valve body;
a flow path hole penetrating and connecting the inlet and the first outlet of the valve tube in a state where the closing part blocks the second outlet; and
an opening hole connected to the flow path hole,
wherein the opening hole and the flow path hole connect the inlet and the second outlet of the valve tube in a state where the closing part blocks the first outlet of the valve tube.

3. The variable valve for the muffler of claim 1,
wherein the opening hole is connected to the inlet of the valve tube and the flow path hole is connected to the second outlet of the valve tube, in a state where the closing part blocks the first outlet of the valve tube.

4. The variable valve for the muffler of claim 1,
wherein the muffler discharges the exhaust gas having passed through an inside thereof to the atmosphere through the tail pipe and another tail pipe installed separately from the tail pipe.

5. A dual muffler, comprising:
a housing;
a first tail pipe for discharging exhaust gas having passed through an inside of the housing;
a second tail pipe for discharging the exhaust gas having passed through the inside of the housing;
a variable valve installed in a middle of the first tail pipe; and
a branch pipe interposed between the variable valve and the inside of the housing,
wherein the variable valve has an inlet into which the exhaust gas is flowed, and a first outlet and a second outlet into which the exhaust gas is discharged,
wherein the inlet of the variable valve is connected to an upstream pipe of the first tail pipe between the housing therewith,
wherein the first outlet of the variable valve is connected to a downstream pipe of the first tail pipe for discharging the exhaust gas to atmosphere, and
wherein the second outlet of the variable valve is connected to a branch pipe for recirculating the exhaust gas flowed into the variable valve through the inlet into the housing.

6. The dual muffler of claim 5,
wherein the variable valve comprises
an actuator;
the valve tube having the inlet, the first outlet, and the second outlet, and installed in the middle of the first tail pipe; and
a valve body in a ball shape rotatably installed in the valve tube, and rotatable by a rotational force delivered from the actuator to block the inlet, or to communicate the inlet with a selected one of the first outlet and the second outlet according to a rotated state of the valve body.

7. The dual muffler of claim 6,
wherein the valve body in the ball shape comprises
a closing part for blocking a selected one of the inlet, the first outlet, and the second outlet of the valve tube according to the rotated state of the valve body;
a flow path hole penetrating and connecting the inlet and the first outlet of the valve tube in a state where the closing part blocks the second outlet; and
an opening hole connected to the flow path hole,
wherein the opening hole and the flow path hole connect the inlet and the second outlet of the valve tube in a state where the closing part blocks the first outlet of the valve tube.

8. The dual muffler of claim 7,
wherein the opening hole is connected to the inlet of the valve tube and the flow path hole is connected to the second outlet of the valve tube, in a state where the closing part blocks the first outlet of the valve tube.

* * * * *